L. G. McCLINTOCK.
WELDING.
APPLICATION FILED JUNE 1, 1921.
1,425,529. Patented Aug. 15, 1922.
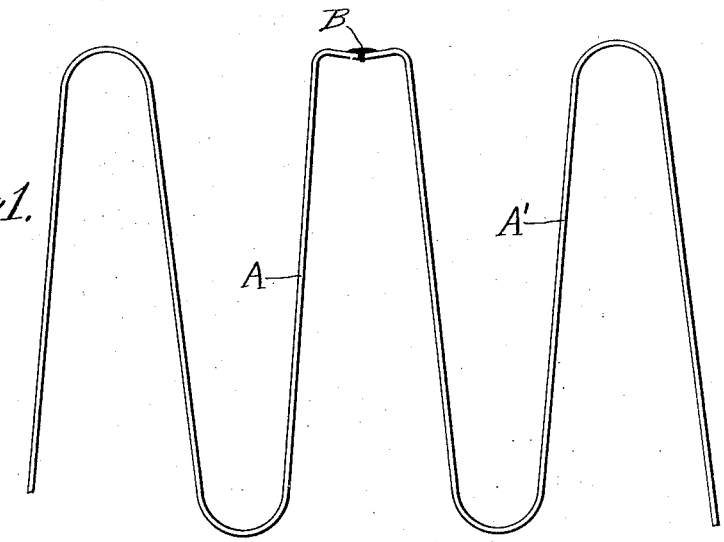
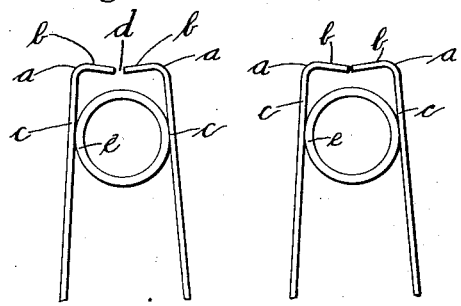
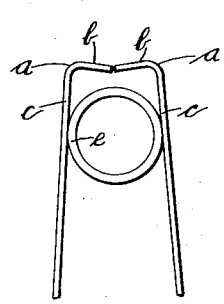
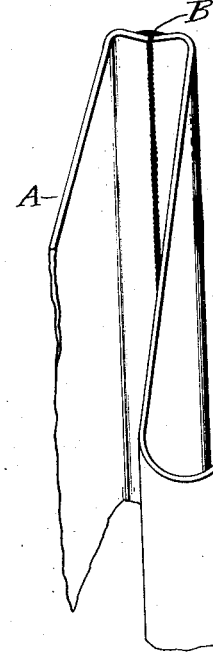
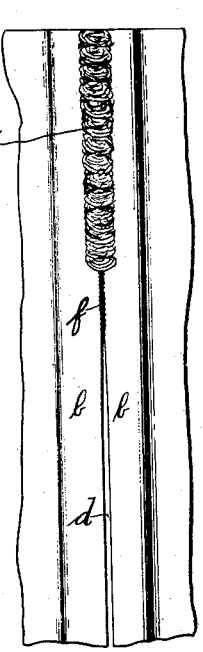
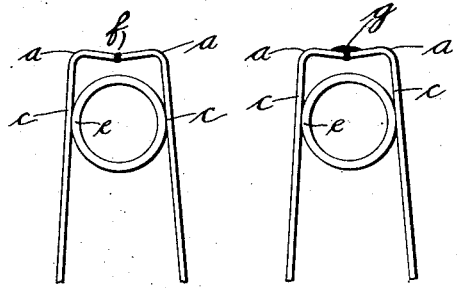
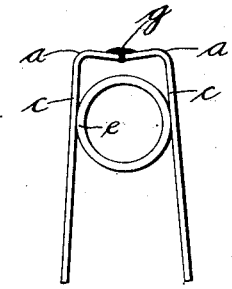
Inventor
Lewis G. McClintock
By his Attorneys
Edwards, Sager + Bower.

UNITED STATES PATENT OFFICE.

LEWIS G. McCLINTOCK, OF PITTSBURGH, PENNSYLVANIA, ASSIGNOR TO PITTSBURGH TRANSFORMER COMPANY, A CORPORATION OF PENNSYLVANIA.

WELDING.

1,425,529.  Specification of Letters Patent.  Patented Aug. 15, 1922.

Application filed June 1, 1921. Serial No. 474,171.

*To all whom it may concern:*

Be it known that I, LEWIS G. MCCLINTOCK, a citizen of the United States, residing at Pittsburgh, in the county of Allegheny and State of Pennsylvania, have invented certain new and useful Improvements in Weldings, of which the following is a specification.

My invention relates to an improved method of welding a joint or seam between two pieces of sheet metal and is particularly applicable to the welding of fluted sheet steel tanks such as the oil tanks for self cooled electric transformers. My invention is also applicable to other fluted or corrugated devices such as radiators and to other containers in which the joint or seam may be formed on an outwardly or inwardly projecting portion of the device.

In these devices and particularly such as transformer tanks, the seam must be adapted to withstand high pressures and strains, must be entirely free from any leaks and must be durable; and the welding must be done in such a way as not to impose upon the sheet metal any destructive strains or distortions in shape or have any inherent strains which in time might cause a breaking or tearing of the parts when subjected to an additional strain in transportation or installation or by changes in temperature in normal use.

Very thin sheets are impracticable in structures under consideration here and the problem is one of much more difficulty than in the case of thin sheets, or in the case of narrow strips. With large sheets in the neighborhood of one-sixteenth of an inch thick or more, the difficulties of expansion and distortion as the welding progresses and of contraction and setting up of inherent strains after cooling, make it difficult to obtain good results with a minimum amount of labor. Such sheets have been frequently overlapped and one edge first welded on one side and the other overlapping edge then welded on the opposite side of the sheet. This is expensive in time and labor and does not overcome the difficulties of expansion and distortion of the sheets or insure the making of a good joint even with trained and careful workmen. Sometimes the edges of the sheets have been folded and the folded parts of adjacent sheets brought face to face against each other, and the edges thereof welded together, but this is also objectionable because of the difficulty of preventing distortion and also because melted metal drops between the folds.

The main object of my invention is to obtain a method of welding sheets of the character referred to, which may be performed easily and quickly, be economical in labor and amount of welding material required, and result in obtaining a seam of a strength equal to or greater than the strength of the sheet material, and avoid inherent strains or distortion of the work when completed, so that no inherent weakness exists in the finished product.

My invention will be understood from the following description and the accompanying drawings in which Fig. 1 is an end view of a portion of a fluted tank showing a welded seam; Fig. 2 is a perspective view of the same; Fig. 3 is an end view indicating the initial placing of the parts; Fig. 4 is a similar view indicating the relationship generally of that portion of the sheets which is heated before welding; Fig. 5 is a similar view showing the weld as first made; Fig. 6 is a similar view showing the completed weld, and Fig. 7 is a plan view of the outside of a portion of the sheets indicating the seam in the process of being welded.

A portion of two of the fluted sheets welded together are shown in Figs. 1 and 2 at A, A' welded at B. The method of welding and character of weld will be explained in connection with Figs. 3 to 7. The welding is conveniently accomplished by use of the acetylene welding process or the use of electric current and drawing an arc between the work and the electrode of welding metal.

The weld is made at one of the bends of the fluted structure as shown in Figs. 1 and 2. The two sheets to be joined are first bent at their edges as shown in Fig. 3 with a rounded bend $a$ and a portion or edge $b$ of each sheet approximately at right angles to the adjacent end portion $c$ which extends from the end corrugation to the welded edge of the sheet. The sheets are then brought together so that the edges or portions $b$ are opposite each other but leaving a space $d$ between them as shown in Fig. 3. A pipe $e$ is placed between the portions $c$ of the sheets and serves as a spacer for properly positioning the parts $b$ in relation to each other and to maintain the desired relationship of the parts during the different stages of the welding process.

With the parts related as shown in Fig. 3, the welder starts by first heating a small area of the edge portions $b$ which causes the parts heated to expand, bringing the edges very close to or touching each other edgewise at the heated area, as indicated in Fig. 4. A portion of this area is then brought to welding temperature and welding material deposited and a weld made at and between the edges at this area as shown at $f$ Fig. 5, filling whatever space may be between the edges with welding metal and possibly some passing through to the inside. The operator progresses along the seam in making the weld by warming and heating an area ahead of the weld which causes expansion gradually and progressively of a section ahead of the weld so that the heated portions expand to the relationship indicated in Fig. 4. A portion of this area in the rear of this expanded portion is meanwhile brought to welding heat and welded as indicated in Fig. 5, and welding metal is overlaid on the rear portion of the weld as the work progresses, giving an overlay $g$ forming the completed weld as shown in Fig. 6.

The progressive results attained by the process are indicated in Fig. 7. At the lower portion of Fig. 7 the sheets are not heated, and the space $d$ of Fig. 3 exists, the pipe $e$ serving to keep the edges separated regardless of the effect of the heating of the portions shown in the upper part of Fig. 7. Above the space $d$ in this figure is indicated the expansion due to the progressive heating in advance of the weld bringing the parts in a certain area edge to edge or quite close together. Above this heated area is the actual welding of the edges at $f$; and above this the completed weld with the overlaid welding metal $g$.

The process is a continuous one in general results, but the operator proceeds in operations as conditions warrant and maintains an expanded heated area ahead of the weld, welds at an intermediate area, and overlays at a rear portion of the weld. The spacing means or pipe $e$ meanwhile prevents the parts or sections from overlapping due to the effects of expansion and keeps the parts and during cooling and contraction the spacer keeps the parts $c$ spaced at the original distance, the strains in contraction being in proper relation to each other at all times; taken up and compensated for in the parts $b$, bends $a$ and adjacent portions of parts $c$. The spacer $e$ is removed after the welding is completed and the parts cooled.

My invention results in giving a seam weld which is strong throughout, free from leaks and durable; inherent weakening strains and distortion are avoided, besides giving a well appearing seam which harmonizes in appearance with the other parts of the structure. The advantages in facility of making the weld as above described and in economy of time and labor over prior methods will be apparent to those skilled in the art, besides obtaining far more satisfactory results.

It will be understood that my invention is applicable to welding various types of tanks, containers and other devices.

I claim:—

1. The method of welding sheet metal which consists in assembling the sheet ends extending in the same general direction and with the edges to be welded bent over to oppositely face each other, engaging the sheet ends by spacing means to space apart the oppositely facing edges without engagement of said edges, and heating and welding said edges.

2. The method of welding sheet metal which consists in assembling the sheet ends extending in the same general direction and with the edges to be welded bent over to oppositely face each other, engaging the sheet ends by spacing means to space apart the oppositely facing edges without engagement of said edges, heating the edges and welding said edges together.

3. The method of welding sheet metal which consists in assembling the sheet ends extending in the same general direction and with the edges to be welded bent over to oppositely face each other, engaging the sheet ends by spacing means between said ends to space apart the oppositely facing edges without engagement of said edges, heating the edges and welding said edges together.

4. The method of welding sheet metal which consists in assembling the sheet ends extending in the same general direction and with the edges to be welded bent over to oppositely face each other, engaging the sheet ends by spacing means to space apart the oppositely facing edges without engagement of said edges, heating the edges, filling the space between said edges with welding material, and then overlaying the welding material on the hot freshly formed weld.

5. The method of welding sheet metal which consists in assembling the sheet ends extending in the same general direction and with the edges to be welded bent over to oppositely face each other, engaging the sheet ends by spacing means to space apart the oppositely facing edges without engagement of said edges, progressively heating the edges and progressively welding said edges together while heating.

6. A welded structure comprising sheets of metal having their end portions bent to extend in the same general direction, adjacent edge portions of said ends extending oppositely in substantially the same plane with each other, rounded bends between said edge portions and the remainder of said sheet end portions, a weld formed by welding material filling the space between said edges, and an overlay of welding material on one side only of said weld.

LEWIS G. McCLINTOCK.

Certificate of Correction.

It is hereby certified that in Letters Patent No. 1,425,529, granted August 15, 1922, upon the application of Lewis G. McClintock, of Pittsburgh, Pennsylvania, for an improvement in "Weldings," errors appear in the printed specification requiring correction as follows: Page 2, line 61, after the word "parts" insert the words *in proper relation to each other at all times*, and strike out the same in line 65; and that the said Letters Patent should be read with these corrections therein that the same may conform to the record of the case in the Patent Office.

Signed and sealed this 19th day of September, A. D., 1922.

[SEAL.]

WM. A. KINNAN,
*Acting Commissioner of Patents.*